United States Patent [19]

Heggenstaller

[11] Patent Number: 4,705,472

[45] Date of Patent: Nov. 10, 1987

[54] DEVICE FOR COMPRESSION MOLDING OF SECTIONS WITH A CONSTANT CROSS-SECTION CONSISTING OF VEGETABLE PARTICLES

[76] Inventor: Anton Heggenstaller, Mühlenstr. 9, 8891 Unterbernbach, Fed. Rep. of Germany

[21] Appl. No.: 896,948

[22] Filed: Aug. 14, 1986

Related U.S. Application Data

[62] Division of Ser. No. 673,755, filed as PCT EP84/00040, Feb. 20, 1984, published as WO84/03472, Sep. 13, 1984, Pat. No. 4,649,006.

[30] Foreign Application Priority Data

Mar. 3, 1983 [DE] Fed. Rep. of Germany ....... 3307557

[51] Int. Cl.[4] .............................................. B29C 71/02

[52] U.S. Cl. .................................... 425/261; 100/177; 100/292; 425/330; 425/453

[58] Field of Search ..................... 156/581, 583.1, 500; 100/93 P, 177, 292, 918; 264/120, 125, 126, 294, 347; 425/185, 195, 256, 261, 330, 404, 406–408, 411, 447, 448, 112, 511, 453

[56] References Cited

U.S. PATENT DOCUMENTS

| | | | |
|---|---|---|---|
| 3,762,852 | 10/1973 | Boffet et al. | 425/330 |
| 3,905,735 | 9/1975 | Thomas et al. | 425/256 |
| 3,920,369 | 11/1975 | Boehringer et al. | 425/404 |
| 3,924,995 | 12/1975 | Crooks et al. | 425/548 |
| 3,933,968 | 1/1976 | Sorbier | 264/120 |
| 3,997,643 | 12/1976 | Munk et al. | 264/294 |
| 4,559,194 | 12/1985 | Hegenstaller | 264/120 |

*Primary Examiner*—Jay H. Woo
*Assistant Examiner*—J. Fortenberry
*Attorney, Agent, or Firm*—Karl F. Ross; Herbert Dubno

[57] ABSTRACT

The compression molding of sections, bars, molded articles, or similar, consisting of vegetable particles mixed with binding media was uneconomical, because the relatively short molding time was overlapped by the disproportionate curing time. In order to considerably improve upon this deficiency, the inventor proposes to feed the molded section, or similar, along its longitudinal axis into a curing unit, while the sections between the molding jaws should remain in clamped position. The molding jaws, together with the cured section, are then returned through the press and the section is ejected after the unlocking of the molding jaws. Within the framework of the cyclic work, the individual operating processes can be adjusted to one another.

12 Claims, 10 Drawing Figures

DEVICE FOR COMPRESSION MOLDING OF SECTIONS WITH A CONSTANT CROSS-SECTION CONSISTING OF VEGETABLE PARTICLES

CROSS REFERENCE TO RELATED APPLICATION

This is a divisional of co-pending application Ser. No. 673,755 filed on Nov. 1, 1984, now U.S. Pat. No. 4,649,006 issued Mar. 10, 1987.

This application is a national phase application corresponding to the international application PCT/EP 8400040 filed Feb. 20, 1984 and based, in turn, upon a German application No. P 33 07 557.3 filed Mar. 3, 1983.

FIELD OF THE INVENTION

The invention relates to an apparatus for compression molding of sections, bars, molded articles, or the like, consisting of vegetable particles mixed with binding media, particularly wood particles which are cured in their compressed state by heat.

BACKGROUND OF THE INVENTION

A compression molding process of this type is described in the German specification DE-OS No. 30 35 701. According to this, the section or other body is compressed in a compression mold to its ultimate shape, and cured by a heating process. A curing process must be carried out if the binding medium is to bind the individual particles.

The problem of the process referred to hereinabove is the time during in which the curing of the compression molded article or section requires that the body remain in the mold, before a new operation can be initiated. In many cases, it is also necessary to cool the mold, before the next run can be executed.

It is, therefore, of paramount importance to keep the molding time for the individual production pieces as short as possible, so as to be able to recoup the high investment costs. Due to this problem, most experiments have failed. Those plants that are in production, are uneconomical, as large investment costs only yield a very low production.

For this reason, compression molded articles made of vegetable particles mixed with binding media have so far been unable to find an appreciable share of the market. The greatest progress has obviously been achieved with the production of one-piece pallets made of compression molded vegetable particles which have the disadvantage of the afore-mentioned disproportion in regard to investment and production.

OBJECT OF THE INVENTION

The object of the invention is, therefore, to provide a further developed process and device by means of which it is possible to considerably increase the productivity of sections, bars, molded articles, or the like, without increasing the investment costs.

SUMMARY OF THE INVENTION

According to the invention, the solution of this problem is based on DE-OS No. 30 35 701 wherein the section, having been molded into its ultimate shape, is shifted with its molding jaws, which enclose the said section or other body, along its longitudinal axis into at least one movable clamping device, while maintaining the molding end position, whereupon the clamped section is cured by the effects of heat, and the molding jaws of another set of molding jaws are returned to molding position.

The general concept of this invention is to cure the molded sections or bodies outside the mold. This is not surprising, as it appears to be logical that the molding cycle within a mold should not be prolonged by the curing time.

The difficulty arises in that a compression molded section, which is to possess the desired high degree of strength and rigidity, behaves differently than an object molded with a different material, e.g. plastic. It has been proved that a mixture consisting of vegetable particles and mixed with binding media immediately loses in strength or even crumbles if subject to the effects of expansion, if it remains untreated even over a short period of time. On the basis of these facts, which cannot be deduced from the state of the art, the molded section, according to the invention, is then fed, together with the shape-giving molding jaws to the curing unit, whereby it is essential that the molding jaws located in the curing zone are unable to recede. It has further been proved that the force of expansion inherent in the molded section unexpectedly decreases during the continuance of curing, so that the frictional resistance, which had presented some misgivings, does not take effect during the curing phase of the section to the extent that normally ought to have been expected.

For instance, one of the advantages is to return the molded and cured section by the same route the blank previously traveled during the molding process. One might think that this might interrupt the production cycle. If however, the cycle of the press and the curing process of the molded sections are coordinated, the extraordinary increase in production, as well as savings in construction costs, are quite astonishing.

Within the scope of this invention, of course, a number of variants are possible, which are not elaborated upon in detail. For instance, it is possible to continuously run the molded section through a curing unit while its molding jaws are in clamping position, and then to unlock the jaws from the section and to return them to the compression chamber.

It therefore proves that the invention is not restricted to the described embodiments, but that, in view of the disclosure according to the invention, it can be varied in a number of ways.

BRIEF DESCRIPTION OF THE DRAWINGS

The embodiments of the invention are illustrated in the following schematic drawing and examples. In the drawings.

SPECIFIC DESCRIPTION

Figure 1:
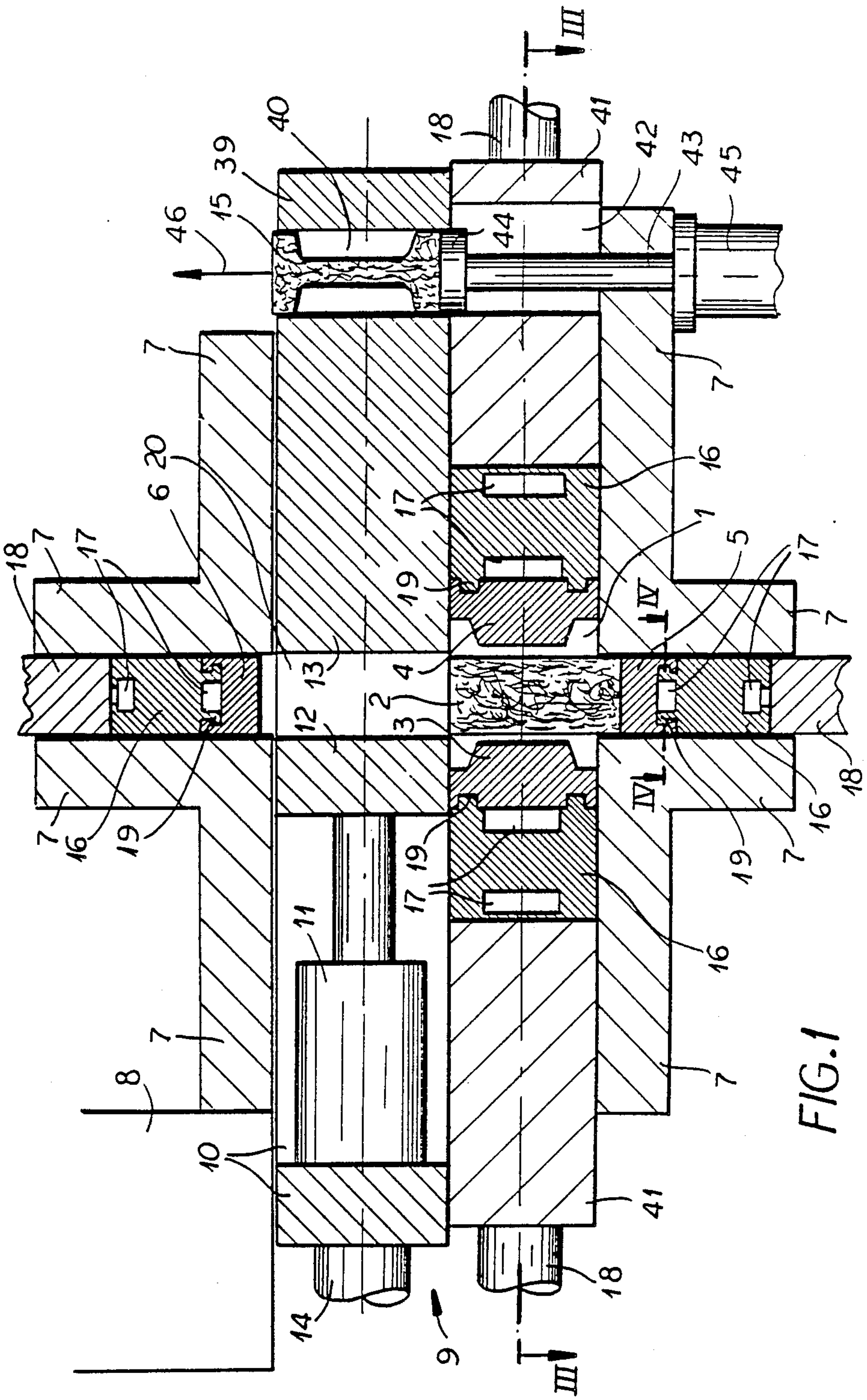
FIG.1 is a vertical section through a press for the production of sections prior to the commencement of the actual molding cycle.

The operation of the device of FIG. 1 starts out with the compression chamber 1 located inside the press, into which the section blank or compressible body 2 is inserted by a method described hereinafter. This section blank 2 consists of vegetable particles, particularly wood particles, which are mixed with a binding medium or binder. After the final molding, the mixture is set or cured by heat.

From the section blank 2, which in the embodiment has a cross-section in the form of a rectangular block, a section with a constant cross-section is to be molded which, for example, is specified as an I-section 15. The invention, of course, also encompasses other sections with varying cross-sections, such as support beams for pallets, supports, bars, rails, chair legs, and the like. The molding jaws 3, 4, 5 and 6 are located within the area of the compression chamber 1 of the press, the components of which do not require heating by selective methods, of which the jaws 3 and 4 form the web area of the completed section 15, and the jaws 5, 6 the flange area. All jaws 3 through 6 encompass the section blank 2 or the subsequently formed and completed section 15. The embodiment prescribes a preforming action which takes part prior to the shaping of the section 15 which is to be completed. For this purpose the jaws 3 through 6 are located within the guides 7 allocated to them in the retracted position illustrated in FIG. 1.

A weigh feeder 8 is schematically represented through which the mixture, which is to be molded and is mixed with binding media, is fed to a preforming chamber which is not shown in FIG. 1. This preforming chamber is actually formed by the shaft 20 which in the example of FIG. 1 is located above the compression chamber 1. This shaft 20 is limited by the mold gib 12 and the counter gib 13 the spacing of which can be varied by means of lifting elements 11 which, together with the mold gib 12 and the counter gib 13 are combined in one frame 10. One must imagine, as if the arrangement 10 through 13 had been displaced toward the left-hand side of the plane of the drawing, while the shaft 20 is located underneath the weigh feeder 8, and while further the distance between the molding gib 12 and the counter gib 13 is extended to the width of the weigh feeder 8 by means of jack or storke producing elements 11. The shaft 20, which thus is located underneath the weigh feeder, admits a metered quantity of said mixture which is to be preformed to a rectangular block, before the section blank 2 formed therewith reaches the compression chamber 1. This can be achieved by several different means. The section blank 2 can, for instance, be preformed underneath the weigh feeder 8 and then be advanced to the position illustrated in FIG. 1. This, however, presupposes an arrangement of a slide (not illustrated) between the weigh feeder 8 and the preforming tool 9. After the extended shaft 20 has been filled in, it is also possible to displace the preforming tool 9 toward the right-hand side in the drawing of FIG. 1, and during this motion the molding gib 12 can be moved closer to the counter gib 13, thus terminating the said preforming action as soon as the moldings gibs 12, 13 reach the locations illustrated in FIG. 1. In this instance, the motion of the preforming tool 9 is aided by a jack or stroke producing element 14 which acts upon the frame 10. A lock slide between the weigh feeder 8 and the preforming tool can, in this case be dispensed with.

In the said embodiment it is assumed that the shaft 20, upon displacement from the position underneath the weigh feeder 8 to the position illustrated in FIG. 1, is reduced by $\frac{2}{3}$ of its width. This produces a corresponding preforming of the mixture is filled into the shaft 20, while the degree of preforming being chosen depending on individual requirements.

In each case, the preformed section blank shown in FIG. 1 is first located above the compression chamber 1. If however the distance between the molding gib 12 and the counter gib 13 is increased to a greater or lesser degree, the section blank 2 is able to enter the compression chamber 1. This occurrence is due either to the force of gravity or to the displacement of the molding jaw 6 which is moved downward, said molding jaw being in rest position above the section blank 2. At the end of this process, the section blank 2, as is shown in FIG. 1, is located within the compression chamber 1.

At this point a molding action is carried out similar to the that of European patent specification, file No. 82 111 990.6. According to this, it has proven practicable to consecutively and, if possible, repeatedly mold the section blank 2 from several directions. With the example given in FIG. 1, it is however recommended to lift the section blank 2 by means of the molding jaw 5 to such an extent that this will result in a symmetry at the lateral molding jaws 3, 4. As soon as the section blank 2 has reached this center position (not shown in FIG. 1), the molding jaws 5, 6 will in this embodiment be moved against each other, so that the section blank 2 is compressed vertically. By subsequently reducing or releasing the molding pressure of these molding jaws 5, 6, the lateral molding jaws 3, 4 can be advanced into the blank. The lateral molding jaws 3, 4 then remain in their position, whereupon the vertical molding jaws 5,6 again act upon the section blank 2, until said blank has taken on the shape of the section 15 shown in FIG. 2.

This multistage molding method may be varied in a number of ways.

This molding operation may take place by so-called cold molding. This means that the molding jaws 3 through 6 do not require any special heating. However that it is practicable to utilize preheated molding jaws 3 through 6, so that, while the section blank 2 is subjected to compression, the effect of heat is already able to take place, but should not result in the setting of the binding medium.

Figure 2:
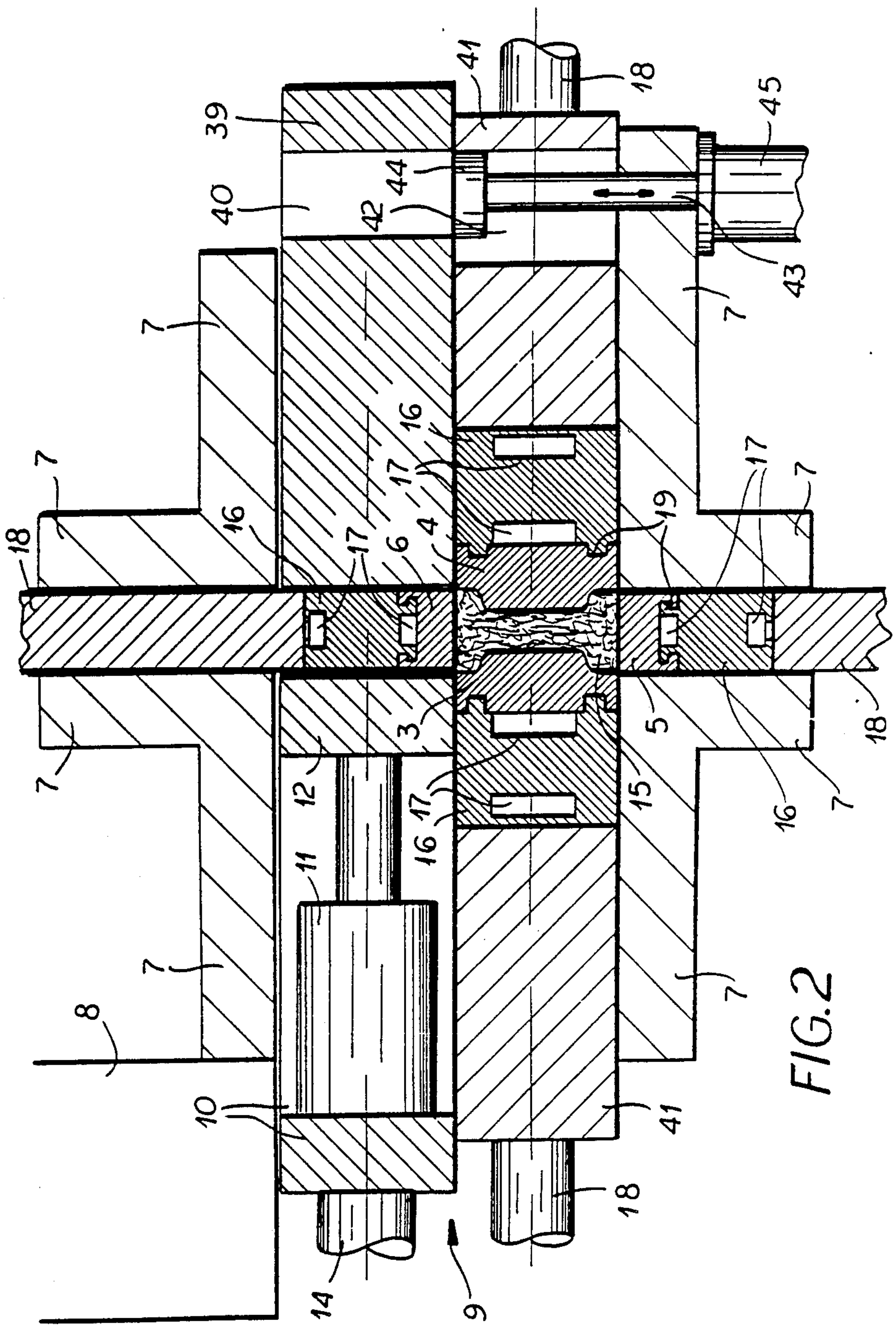
FIG. 2 is a vertical section in accordance with FIG. 1, including an illustration of the molding end position of the section.

The completed section 15, as is illustrated in FIG. 2, is now removed from the compression chamber 1 along its lateral axis, while, in accordance with the invention, it is important that the molding jaws 3 through 6 are moved in the same way. For this purpose, the molding jaws 3 through 6 are supported on roller conveyor 17 which are adjacent to the force plugs 16. The force plugs 16 are moved by jacks 18. This will subsequently result in a plane of division between the molding jaws 3 through 6, on the one hand, and the force plugs 16 allocated to the jaws, on the other hand, which extend parallel to the longitudinal axis of the section 15. The molding jaws 3 through 6 move together with the molded section 15 out of the compression chamber 1 in the direction of the longitudinal axis of said section. As will become apparent later, the molding jaws 3 through 6 must be interlocking in the direction of the mold with the force plugs 16 allocated to them, and interconnected in the longitudinal direction of the section 15; for this purpose the embodiment of FIG. 1 shows various forms of guided locks 19, e.g. dovetails. With the molding jaws 3, 4, these guided locks 19 are shaped in the form of dovetail guides, and in the case of the molding jaws 5, 6, they are designed as hammerhead-shaped slot guides. The purpose of this is that an individual force plug 16 will be able to return the molding jaw 3 through 6 allocated to it from the final molding end position to the position indicated in FIG. 1. It is obvious that guided locks 19 of this type can be designed in a number of ways.

Figure 3:
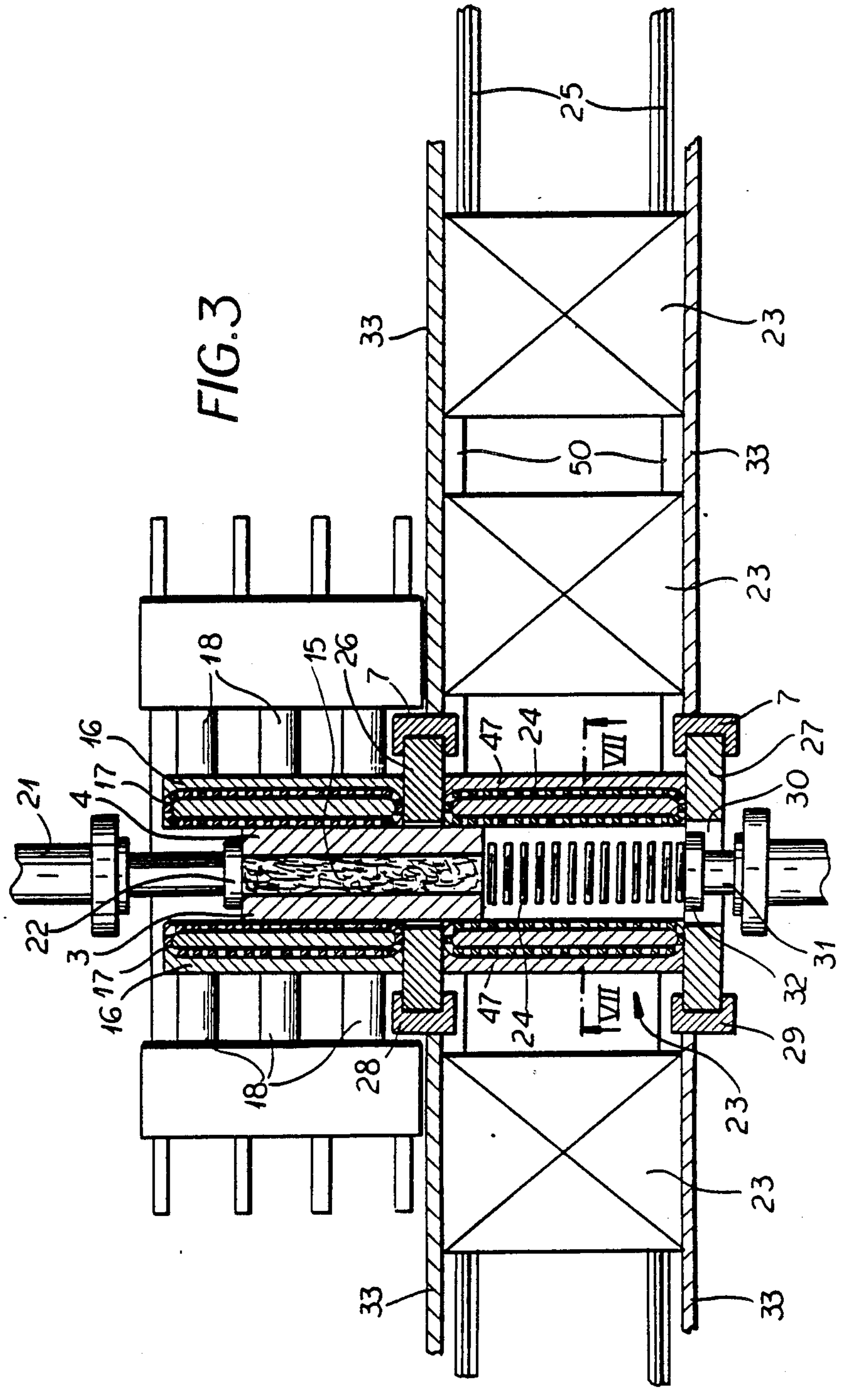
FIG. 3 is a horizontal section along line III—III in FIG. 1 through the press, with subsequent curing unit.

The embodiment of FIG. 3 now shows how the section 15, which is molded in the compression chamber 1 in its cross-sectional form, can be shifted along its longitudinal axis from the compression chamber 1 and placed in a curing unit. The purpose of said curing unit is to accommodate the completed section 15 in its clamped condition and to cure it, while the section blank 2 next to the completed section 15 is being molded. It must be taken into consideration that the time required for molding the section 15 is considerably shorter than the curing time. For this purpose, the curing unit is so designed that it is able to accommodate a number of molded sections 15.

As is illustrated in FIG. 3, the molded section 15, together with its molding jaws 3 through 6 which are in molding end position, are moved by means of a jack 21 along the longitudinal axis, while the ejection plate 22 of the element 21 not only shifts the completed section 15, but also the allocated molding jaws 3 through 6. This shifted unit 3 through 6, 15 is now transferred from the roller conveyor 17 to the roller conveyor 24 which is arranged in a clamping device 23. Both roller conveyors 17, 24 are in alignment with each other. The term "clamping device" is generally referred to as a device which is able to accommodate in a clamped position the molding jaws 3 through 6 with the completed section 15 clamped between them, and to transfer it to the curing unit.

Figure 8:
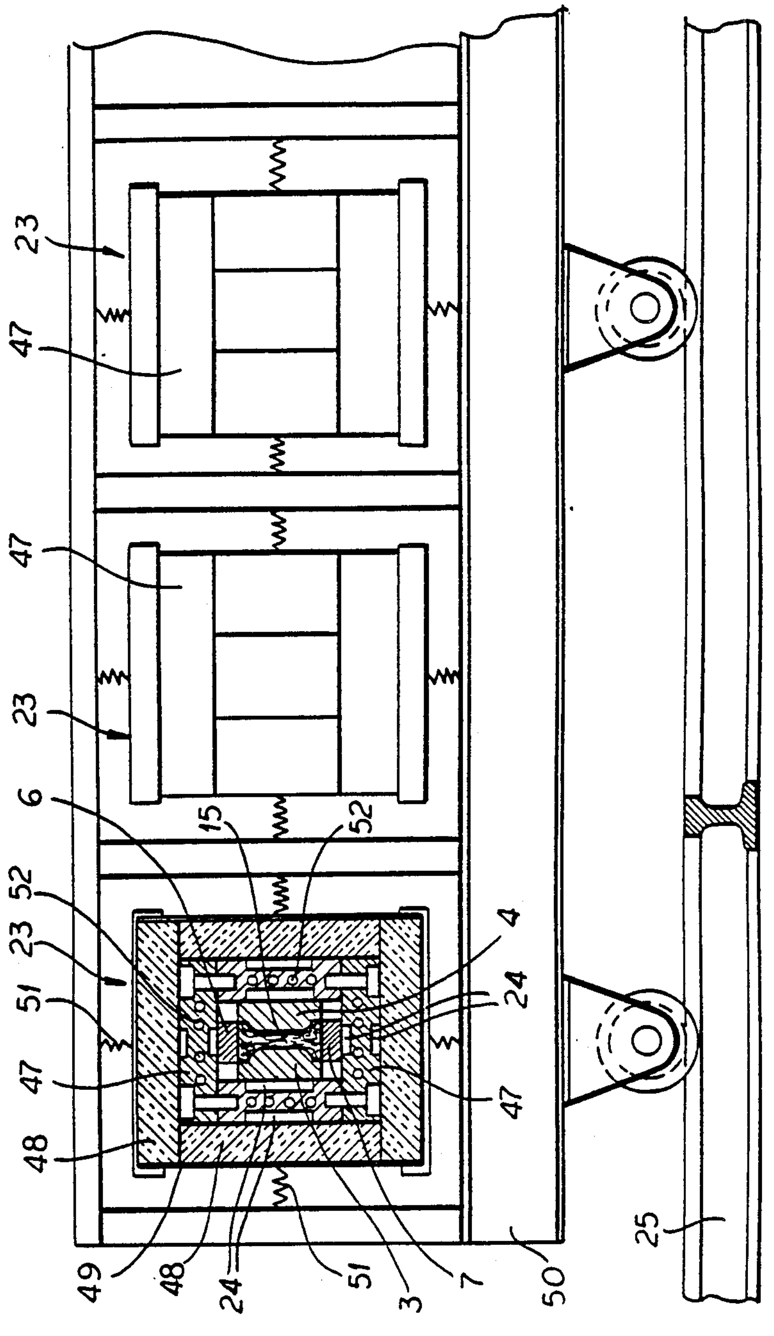
FIG. 8 is a vertical section through the clamping device along line VIII—VIII in FIG. 3.

In the embodiment of FIG. 3, the clamping device 23 is located in a base frame, as is illustrated in FIG. 8, which is movable along rails 25 which extend transversely to the moving direction of the jacks 21. As will be shown later, this action can be varied in a number of ways.

If, however, the set of molding jaws 3 through 6, as is illustrated in FIG. 3, is shifted forward with the completed section 15 by means of jacks 21, this will create friction due to reactive forces which, in the case of the embodiment in FIG. 3, can be absorbed by the mold slides 26, 27. These mold slides 26, 27 are held in support rails 28, 29 which are stationary and serve a double purpose. When the section blank 2 is formed within the compression chamber 1 by means of compression, care must be taken that the molding compound is unable to escape at the front end.

The mold slide 26, which on one side closes the front end of the compression chamber 1, is designed for this purpose. On the other hand, this mold slide 26 is to permit the movement of the completed section 15 along its longitudinal axis. For this reason, the mold slide 26 has a recess. By vertically adjusting the mold slide 26, the compression chamber 1 is either closed or opened at the front end. Yet, when shifting the molded section 15 with its molding jaws 3 through 6 along its longitudinal axis, an axial thrust occurs via the roller gears 24, which is caught by the mold slide 27 held in the support rails 29. Also this mold slide has a recess 30 through which a jack 31 can reach. By means of its ejection plate 32, this jack 31 is able to return a completely cured section 15 with its molding jaws 3 through 6 to the compression chamber 1, yet this presents only one of several possibilities.

When the clamping device 23 has accommodated the molded section 15 with its molding jaws 3 through 6 when in molding end position, the device, according to the embodiment in FIG. 3, is moved transversely to the longitudinal axis of the completed section 15, so as to feed the completed section 15 to its curing unit. For this purpose, heat can be generated within the clamping device 23, or the clamping device 23 can be passed through a curing channel. See to the description relevant to FIG. 8.

Figure 4:
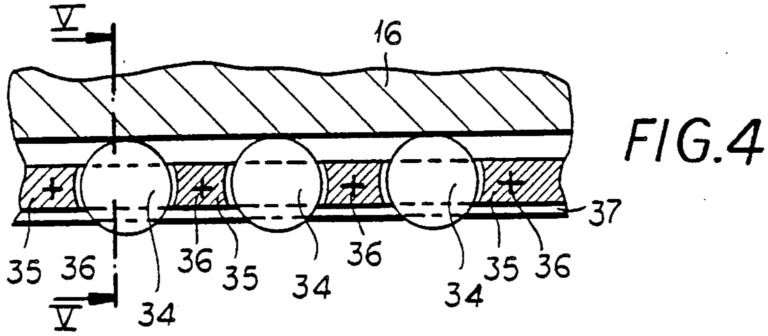
FIG. 4 is a section along line IV—IV in FIG. 1 through a roller conveyor.
Figure 5:
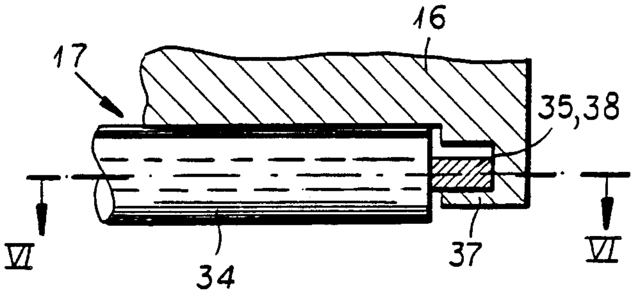
FIG. 5 a section along line V—V in FIG. 4 through the roller conveyor.
Figure 6:
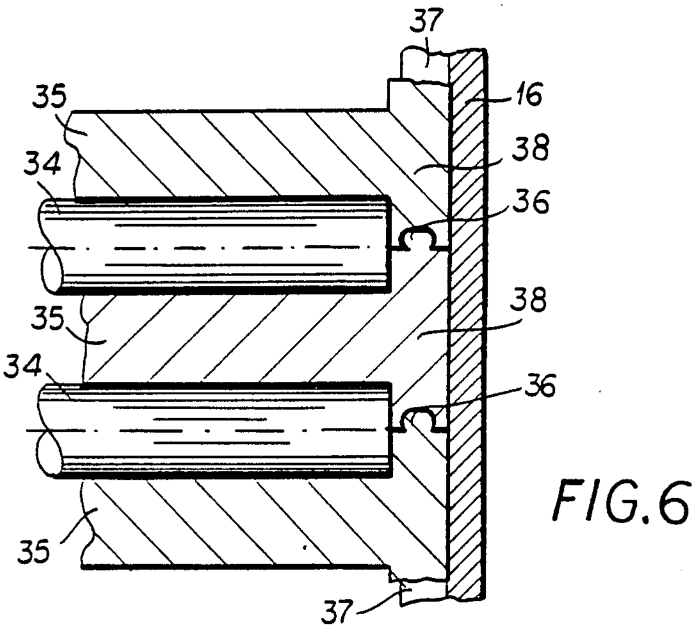
FIG. 6 is a section along line VI—VI in FIG. 5 through the roller conveyor.

FIGS. 4 through 6 show details for the development of an individual roller conveyor 17 (compare with FIG. 1). This roller conveyor consists of individual rolls 34 spaced by shoes 35. These shoes 35 have the usual geometric shape. Preferably these shoes are made of steel, because they must be resistant on account of the curing temperature. On the inside, the rolls 34 are supported against the force plug 16 (compare with FIG. 1). On the outside, the rolls 34 act upon the molding jaws 3 through 6 and permit said jaws the roll with low frictional resistance. It has proven to be practicable to develop the roller conveyor 17 as circulating roller conveyors (compare with FIG. 1). For this purpose, the rotary shoes 35 must be articulated. In the example given in FIG. 4, the joint 36 is symbolically represented.

FIGS. 5 and 6 show that the edges of the rotary shoes 35 projecting across the rolls 34 at the front end are guided on guide fillets 37 of the force plugs 16, so that they are unable to escape in the direction of the molding jaws 3 through 6. The formation of the joints 36 in the area of the attachments 38 can be designed similar to those of a bracelet. The design of such roller conveyors 17 is generally known and thus requires no further explanation. It is, however, essential that the rolls 34 are linked at a constant distance and its joints are articulated. It therefore is possible to operate and design the roller conveyors 17 in such a way, so as to be able to interlock and rotate.

The same applies to the roller gears 24 arranged in the area of the clamping device 23 (FIG. 3).

FIG. 3 further indicates that guide walls 33 are extended along the molding slides 26, 27, so as to cover the front ends of the molded sections 15, while they are moved along the rails 25 by means of the clamping devices 23. This will prevent a front end extension or crumbling of the completed sections 15. Since the section 15 shrinks in the course of continued curing, only a negligible friction occurs during the lateral displacement of the clamping devices 12.

Figure 7:
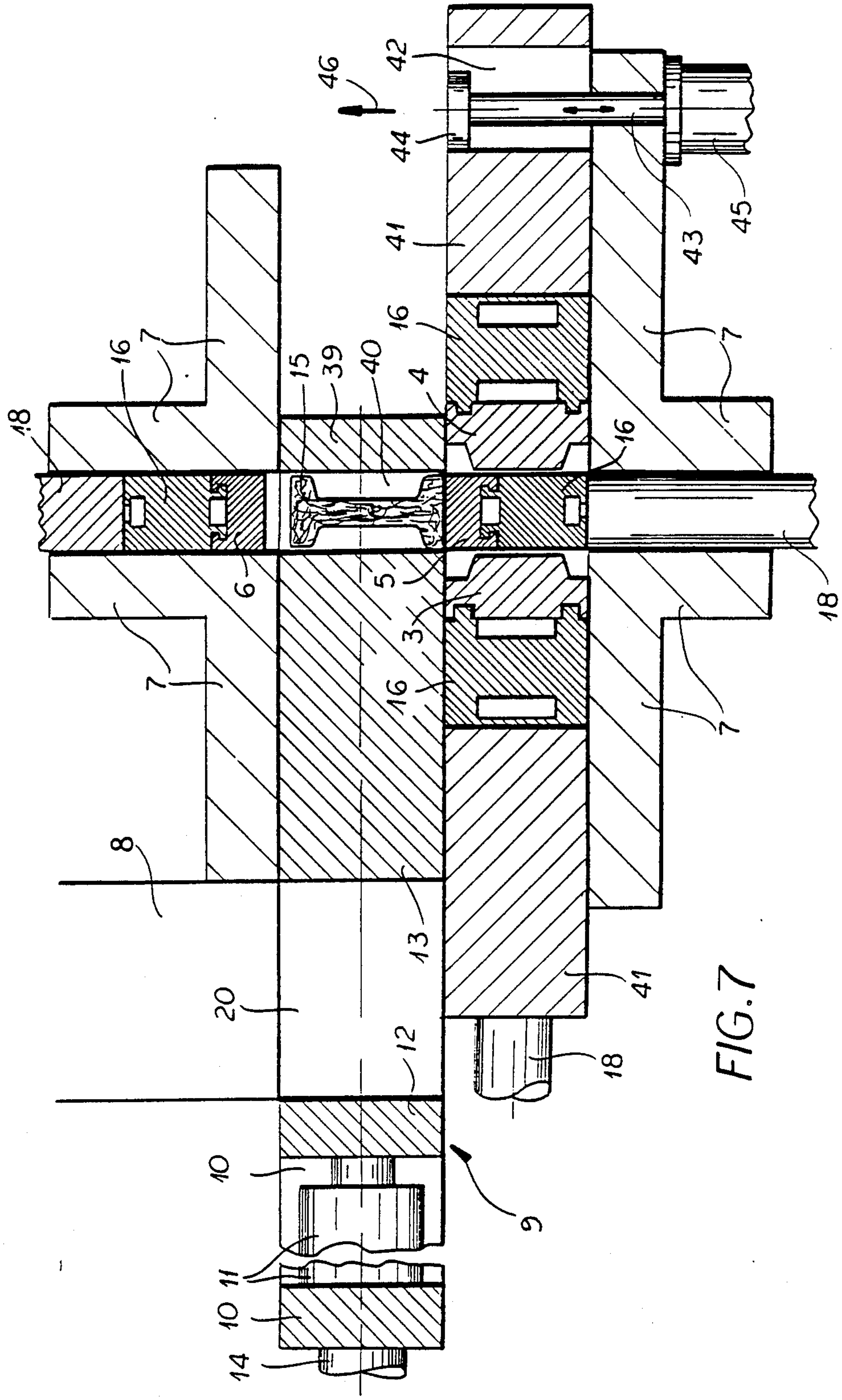
FIG. 7 is a vertical section through the press in accordance with FIG. 1 in knock-out position for the completed and cured molded sections.

The example of FIG. 7 illustrates a situation of the press which is only comparable with that shown in FIG. 1, while it is assumed that the completely cured sections 15 are moved back to the position indicated in FIG. 3 and returned via the jack or lifting element 31 with the ejection plate 32 into the compression chamber 1.

As soon as the molding jaws 3 through 6 have, again, reached the compression chamber 1, the lateral molding jaws 3, 4 are moved back to starting position in accordance with FIG. 7, thus providing the molded profile 15 with the required degree of freedom to be able to be lifted by means of the lower molding jaw 5 and the allocated force plug 16 18 in the position illustrated in FIG. 7. At the same time, the molded section 15 enters the shaft 40 which is located between the counter gib 13 and the closing wall 39. The preforming tool 9 is, at the same time, transposed to the position which in the drawing is moved toward the left-hand side. While the preforming tool 9 is moved in the drawing toward the right-hand side, one preformed section blank 2, on the one hand, enters the position of the shaft 20 above the compression chamber 1. On the other hand, by the same motion, the completed section 15 which has been lifted, is shifted sideways to the position indicated in FIG. 1. While in this position, an ejector 43 with a front end plate 44 (or several plates) passes through several bores 42 of the mold slide 41, and ejects the molded section 15 from the shaft 40 in the direction of the arrow 46. Here the ejector 43 is connected to a jack or lifting element 45 which, for instance, can be flanged at the guide 7. Corresponding to the lift of the mold slide 41, the bores 42 are larger than the ejector 43. When ejecting the completed section 15 with the molding jaws 3 through 6 in accordance with FIG. 3, it must be expected that the clamping device 23 is not in true alignment. For this reason, the clamping device, in accordance with the embodiment of FIG. 8, is spring mounted on all sides. For this, a tenter 47 is used (compare with FIG. 8) which accommodates the unit 3 through 6, 15 which was shifted away from the front end. But, in order to align this tenter 47 with the longitudinal axis of the ejected section 15, said tenter is supported via springs 51 at the base frame 50, while between tenter 47 and base frame 50 are located an insulation 48 and a surrounding outer wall 49. Within the tenter 47, heating elements 52 are arranged whose task it is to cure the sections 15 accommodated in the tenter 47. The clamping device 23, also, is equipped with roller conveyors 24 (compare FIG. 3).

If one molded section 15 with its molding jaws 3 through 6 has been accommodated in the clamping device 23, the base frame 50 is moved transversely, so that a new clamping device 23 is placed at the front end of the compression chamber 1. Accordingly, a multitude of similar clamping devices 23 can accommodate such molded sections 15 and transfer them to the curing unit. As soon as a section 15 has been cured, the clamping device 23 of said section is, according to FIG. 3, again moved in front of the compression chamber 1, so that the lifting element 31 with its ejection plate 32 can again slide the unit 2 through 6 and 15 into the compression chamber 1. From there the ejection will take place within the meaning of the illustration shown in FIGS. 7 and 1.

According to FIG. 8, the base frame 50 can obviously be subdivided into several base frames, while it is possible to convey these individual base frames to curing units and retrieve them after the profiles 15 have been cured.

Figure 9:
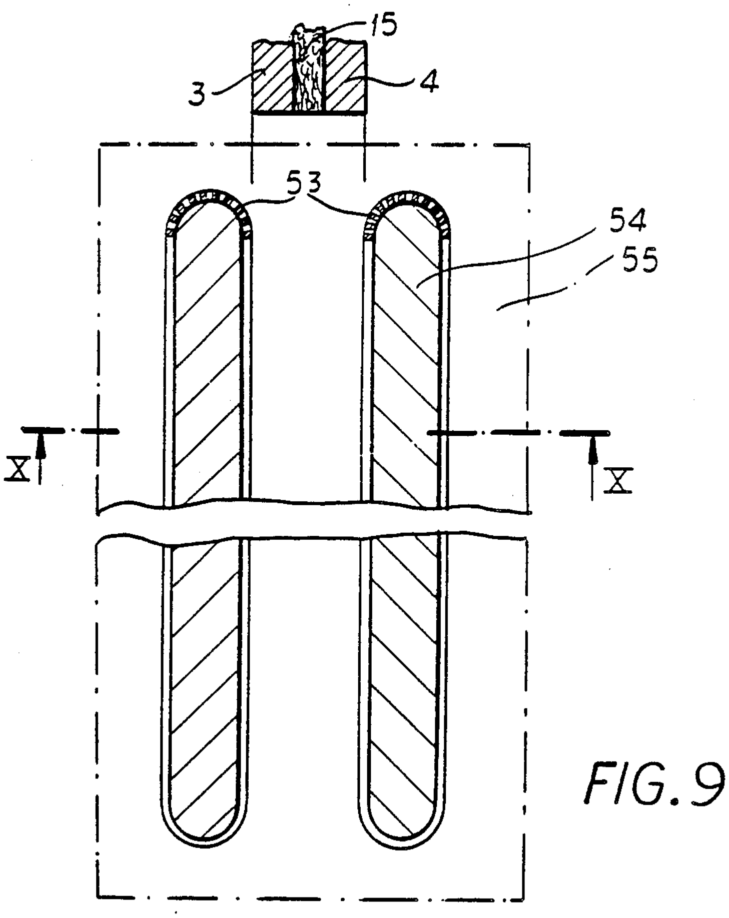
FIG. 9 is a horizontal section through one of the embodiments of the curing unit.
Figure 10:
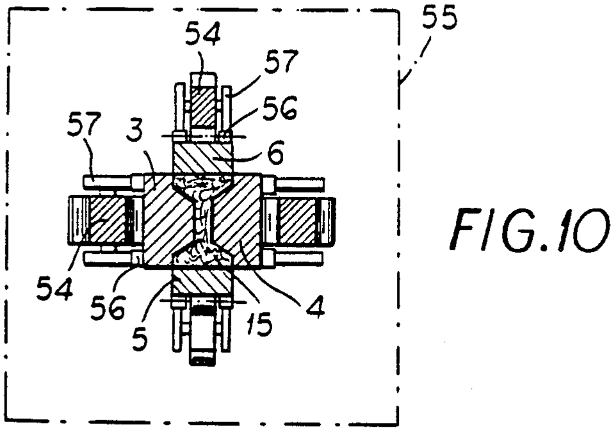
FIG. 10 is a cross-section along line X—X in FIG. 9.

A variant to FIGS. 3 and 8 is shown in FIGS. 9 and 10. According to this, the unit consisting of the molding jaws 3 through 6 and molded section 15 is moved into a rotary roller conveyor 53 which is supported at conveyor beds 54. This roller conveyor 53 can, for instance, be located within a curing channel 55.

In order to reduce the friction between the roller gears and the 53 ejected unit 3 through 6, 15, the molding jaws 3 through 6 can, according to FIG. 10, be equipped with gears 57 several of which can be arranged within the curing channel 55.

This variant of the embodiment presents the problem of returning the molding jaws 3 through 6 into the compression chamber 1. This can take place by means of ordinary conveyors. But it is also possible to slide the molded section 15 into the roller conveyor 53 without transposing the molding jaws 3 through 6, while the roller conveyors 53 are formed by suitably designed molding jaws which endlessly circulate and, together, form one work path in which the ejected completed section is cured while in clamped condition. Similar installations are known from the production of corrugated plastic pipe.

The stability of the section 15, which is produced apparatus within the meaning of the above embodiments, essentially depends on how the particles, in terms of structure, are aligned in the area of the compression chamber 1. This alignment of the particles is already achieved during the transfer of the weigh feeder 8, in accordance with FIG. 1, into the shaft 20. The invention is based on the assumption that particles are to be compression molded which are aligned preferably parallel to the longitudinal axis of the section 15. The achievement of this is the subject-matter of a different invention.

What is claimed is:

1. An apparatus for the compression molding of an elongate body from particles of vegetable matter and a thermally curable binder, said apparatus comprising:

- means for metering a mixture of said particles and said binder into a chamber to form an elongate blank;
- a first plurality of molding jaws at a pressing station for subjecting said blank to compression between them, said first plurality of molding jaws engaging said elongate blank over its entire length and completely enclosing the periphery of said blank to impart a final shape to said blank conforming to the intended shape of the compression-molded body;
- means for transferring the first plurality of molding jaws and the blank compressed thereby as a unit and without relaxation of compression force to a curing station at a location spaced from the location of said pressing station so that another blank can be subjected at said pressing station to compression by another plurality of molding jaws advanced to said pressing station;
- means for curing the blank at said curing station within the confines of said first plurality of molding jaws and under the pressing forces thereof to transform said blank at said curing station to a corresponding compression-molded body; and
- means for separating the molding jaws of said first plurality to release the compression-molded body transformed from said blank.

2. An apparatus for producing a compression-molded body, comprising:

- a pressing station formed with plurality of molding jaws and means for advancing said jaws to compress a mass of compressible material between them with a predetermined pressure and to a predetermined shape;

means for shifting said jaws in a direction perpendicular to the direction of advance of said jaws with said mass compressed between them to a curing station spaced from said pressing station while maintaining pressure on said mass and said jaws in the relative positions established at said pressing station; and means at said curing station for curing said mass while it is retained within said jaws.

3. The apparatus for producing a compression-molded body defined in claim 2 wherein the means for shifting includes roller-conveyor means between the means for advancing and said jaws.

4. The apparatus for producing a compression-molded body defined in claim 3 wherein the roller-conveyor means includes an array of mutually parallel rollers and retainers for said rollers which are articulated together.

5. The apparatus for producing a compression-molded body defined in claim 4 wherein said roller-conveyor means and the respective jaws are connected by complementary dovetail guides.

6. The apparatus for producing a compression-molded body defined in claim 3 wherein said jaws are held by magnets on said means for advancing.

7. The apparatus for producing a compression-molded body defined in claim 3 wherein said means for shifting includes clamping means for clamping said jaws in pressing positions and shiftable with said jaws along roller conveyor means into said curing station.

8. The apparatus for producing a compression-molded body defined in claim 7 wherein said clamping means includes heating elements for heating said mass.

9. The apparatus for producing a compression-molded body defined in claim 7 wherein said clamping means comprises clamping elements mounted in a frame provided with springs on all sides.

10. The apparatus for producing a compression-molded body defined in claim 7 wherein said clamping means comprises a plurality of clamping devices whose transfer to and return from said curing station are controllable.

11. The apparatus for producing a compression-molded body defined in claim 2, further comprising means for returning said jaws and the compression-molded body received between them to said pressing station.

12. The apparatus for producing a compression-molded body defined in claim 2 wherein said means for shifting includes gearing meshing with gear teeth on each jaw.

* * * * *